United States Patent [19]

Vogeler et al.

[11] 3,934,254
[45] Jan. 20, 1976

[54] RELIABLE CYCLE SELECTION IN LORAN-C SYSTEM

[75] Inventors: William K. Vogeler, Springfield; Donald E. Shorter, Leesburg, both of Va.

[73] Assignee: Telcom, Inc., McLean, Va.

[22] Filed: Sept. 3, 1974

[21] Appl. No.: 502,551

[52] U.S. Cl. ................................. 343/103
[51] Int. Cl.² ............................. G01S 1/24
[58] Field of Search ..................... 343/103

[56] References Cited
UNITED STATES PATENTS

| | | | |
|---|---|---|---|
| 2,811,718 | 10/1957 | Frank | 343/103 |
| 2,873,445 | 2/1959 | Palmer | 343/103 |
| 3,044,064 | 7/1962 | Durbin | 343/103 |
| 3,325,810 | 6/1967 | Frank et al. | 343/103 |

*Primary Examiner*—Maynard R. Wilbur
*Assistant Examiner*—T.M. Blum
*Attorney, Agent, or Firm*—Rose & Edell

[57] ABSTRACT

Reliable cycle selection is achieved with LORAN-C pulses received under low signal-to-noise conditions. A tracking pulse is generated at the LORAN-C pulse repetition rate and is intended to be time-coincident with the end of the third 100 KHz carrier cycle in each received pulse. Sampling pulses are generated one-quarter and three quarters of a cycle before and after the tracking pulse and are used to sample a hard-limited, envelope-derived version of the received signal in which a phase reversal occurs at the start of the fourth carrier cycle. If the tracking pulse is coincident with the end of the third carrier cycle, a unique pattern of binary levels is sampled by the four sampling pulses. If the tracking pulse is too early or too late, corresponding early (left) and later (right) sampled level patterns result. Left and right occurrences of the tracking pulse are individually counted for a predetermined number of received LORAN-C pulses after which the difference between left and right counts is examined. If this difference is less than a pre-established number, the tracking pulse is properly positioned; if the difference exceeds the pre-established number, the track pulse is shifted in time accordingly.

15 Claims, 11 Drawing Figures

RELIABLE CYCLE SELECTION IN LORAN-C SYSTEM

BACKGROUND OF THE INVENTION

The present invention relates to an improved cycle selection technique for use in LORAN-C receivers. Although specifically described in terms of a LORAN-C system, the inventive technique is also generally applicable to any system in which the time between pulsed carrier signals is to be accurately measured or in which a specific carrier cycle in a pulsed carrier transmission is to be accurately tracked.

LORAN-C systems are hyperbolic navigation systems in which transmitters at fixed locations transmit 100 KHz carrier pulses at known pulse repetition rates. A LORAN-C receiver measures the time between reception of such pulses from a master transmitter and each of two slave transmitters. The time between reception of the master pulse and one slave pulse determines a hyperbolic line of position on which the receiver is located. The time between reception of the master pulse and the other slave pulse determines a second hyperbolic line of position on which the receiver is located. The intersection of these two hyperbolic lines accurately defines the position of the receiver. Standard charts for determining position from measured time differences are readily available and in widespread use.

Bandwidth limitations require that the rise time of the transmitted LORAN-C pulse be relatively long, on the order of 50 microseconds. Since the carrier frequency is 100 KHz, the rise time of the pulse extends over approximately five or more carrier cycles. Under such circumstances accurate time measurement cannot be achieved by merely monitoring corresponding amplitude points on the pulse envelope. Therefore, it has become common practice to measure the corresponding points on the received 100 KHz carrier. Specifically, the time of a point on the carrier (for example, a zero crossover) can be determined with much greater accuracy than a point on the much more slowly changing pulse envelope. However, since there are a minimum of ten (and usually more) carrier cycles in each LORAN-C pulse, a cyclic ambiguity exists which can introduce unacceptable errors into the position determination.

There have been a number of prior art approaches to resolving cycle ambiguity in LORAN-C receivers, most of which use an envelope deriver circuit. The envelope deriver circuit sums the received 100 KHz carrier with a version of that carrier which is delayed by ½ cycle (i.e., 5 microseconds) and amplified. The sum is a 100 KHz signal which, depending upon the amplification of the delayed signal, can be arranged to exhibit a phase reversal at the termination of a predetermined carrier cycle in the received pulse. This sum signal, called the envelope-derived signal in LORAN-C parlance, is then hard limited and then sampled in order to determine the location of the phase reversal. If each half cycle of the hard limited envelope-derived signal is examined, a series of alternating positive and negative cycles will be found except at the point of phase reversal where two successive half cycles of like polarity exist. Numerous techniques come to mind for finding this point; however, the problem is greatly complicated by the fact that the LORAN-C pulses are more often than not received in a high-noise environment. It is therefore necessary to monitor the carrier cycles for many received pulses and establish some sort of statistical evaluation after numerous samplings have been made. For example, in one prior art technique, after a coarse acquisition procedure is performed in which a tracking pulse is positioned in time coincidence with some zero-crossover in the carrier of each received pulse, four sampling pulses are generated. One sampling pulse is generated three quarters of a carrier cycle (i.e., 7.5 microseconds) before the tracking pulse; a second sampling pulse is located one quarter cycle (i.e., 2.5 microseconds) before the tracking pulse; and third and fourth sampling pulses are located one-quarter and three quarters of a cycle, respectively, after the tracking pulse. These sampling pulses are used as gates to determine when the hard-limited envelope-derived carrier is to be sampled. If the tracking pulse is properly positioned at the point of phase reversal, samples one and four should be high (binary "1") and samples two and three should be low (binary "0"). Four up/down counters are used to register the "1" and "0" levels so that each time a LORAN-C pulse is received, each counter registers an up or down count, depending upon its corresponding sampled level. After some predetermined number of LORAN-C pulses are received, the counts in the counters are examined to see whether they have net up or down counts. If an up-down-down-up net pattern results, the tracking pulse is considered to be on the proper cycle; if other net patterns are found, the tracking pulse is shifted in time by one carrier cycle and the process is repeated.

The cycle selection technique described above works quite well in the presence of strong received signals. However, low signal-to-noise conditions render that technique unreliable. Specifically, noise tends to render one or more of the sampled binary levels erroneous during each received pulse. As a consequence, even when the tracking pulse is positioned on the proper cycle, many of the sample patterns will not show up as 1-0-0-1 but as some other pattern. Therefore the net pattern, which is examined after the specified number of LORAN-C pulses are received, will often indicate incorrect positioning of a properly positioned tracking pulse.

It is therefore an object of the present invention to provide a cycle selection technique for LORAN-C systems which operates reliably in the presence of poor signal-to-noise conditions.

It is another object of the present invention to provide a method for resolving cycle ambiguity in the tracking of pulsed carrier signals.

It is another object of the present invention to provide apparatus for use in a receiver which permits a particular carrier cycle in a pulsed carrier signal to be identified and tracked in a low signal-to-noise environment.

SUMMARY OF THE INVENTION

In accordance with the present invention, the four sampling pulses are positioned about the tracking pulse as in the aforementioned prior art system and are likewise employed to sample a hard-limited envelope-derived version of the received carrier. The sampled binary levels are immediately evaluated to determine if the resulting pattern is early (left) or late (right) and an appropriate count is added to a left or right binary counter. After a predetermined number of pulsed carrier signals are received, the difference between the counts in the left and right counters is determined. If this difference is less than a pre-established threshold, the tracking gate is considered to be properly positioned. If the count difference exceeds the threshold, the tracking pulse is shifted accordingly by one carrier cycle and the sampling routine is repeated. The invention relies upon the fact that noise will affect a "proper-position" pattern randomly so that, satistically, as many "left" errors as "right" errors occur. On the other hand, for an improperly positioned tracking pulse, the patterns unaffected by noise add to the equally divided noise-affected patterns to produce a net count difference which exceeds the threshold.

BRIEF DESCRIPTION OF THE DRAWINGS

The above and further objects, features and advantages will become apparent upon consideration of the following detailed description of specific embodiments thereof, especially when taken in conjunction with the accompanying drawings, wherein:

FIGS. 5a through 5d are timing diagrams illustrating pulses generated in the circuit of the present invention.

DESCRIPTION OF PREFERRED EMBODIMENTS

Figures 1, 3:
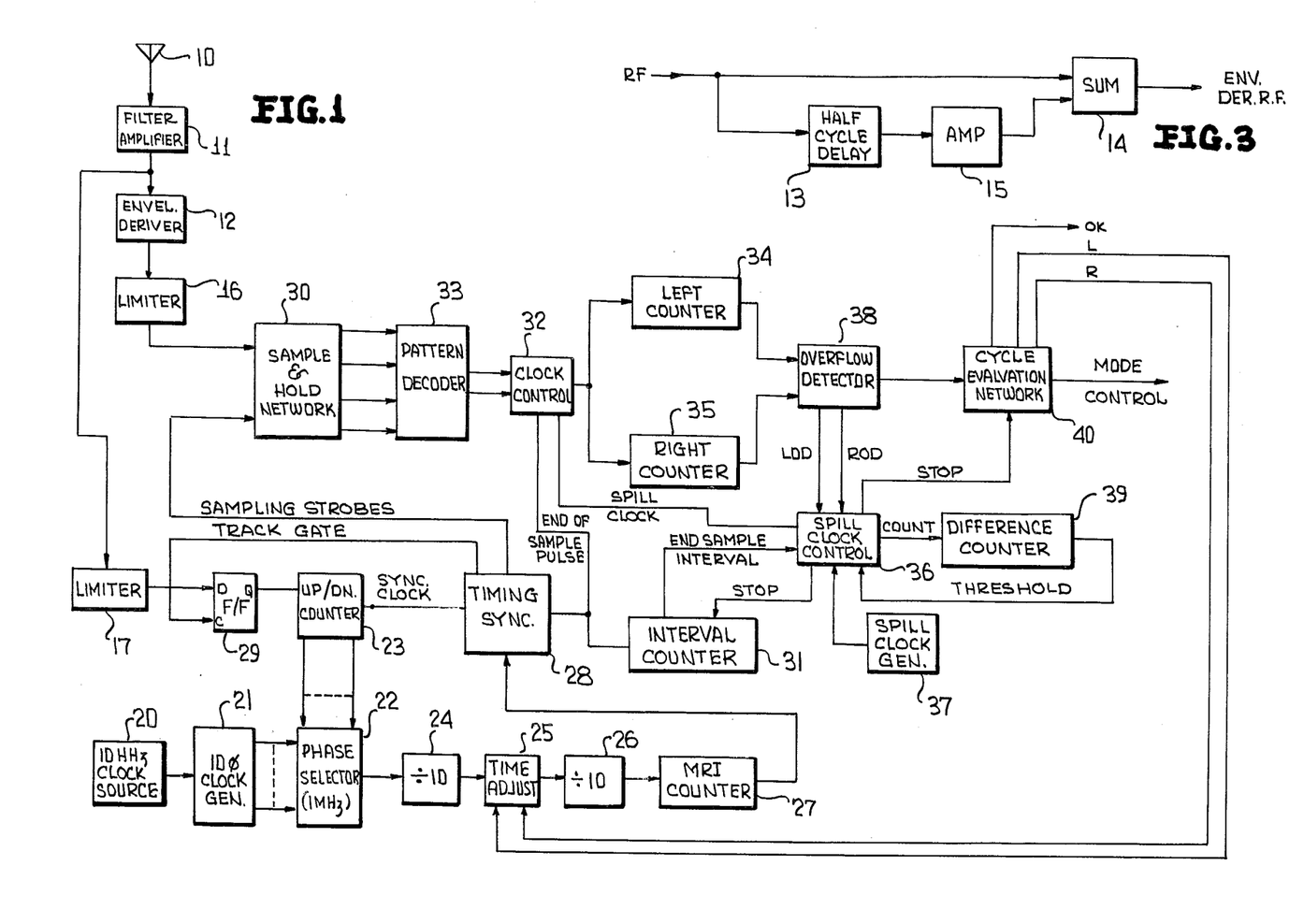
FIG. 1 is a functional block diagram of a cycle selection circuit according to the present invention.
FIG. 3 is a schematic diagram of a conventional envelope deriver circuit as used in the present invention.
Figure 4:
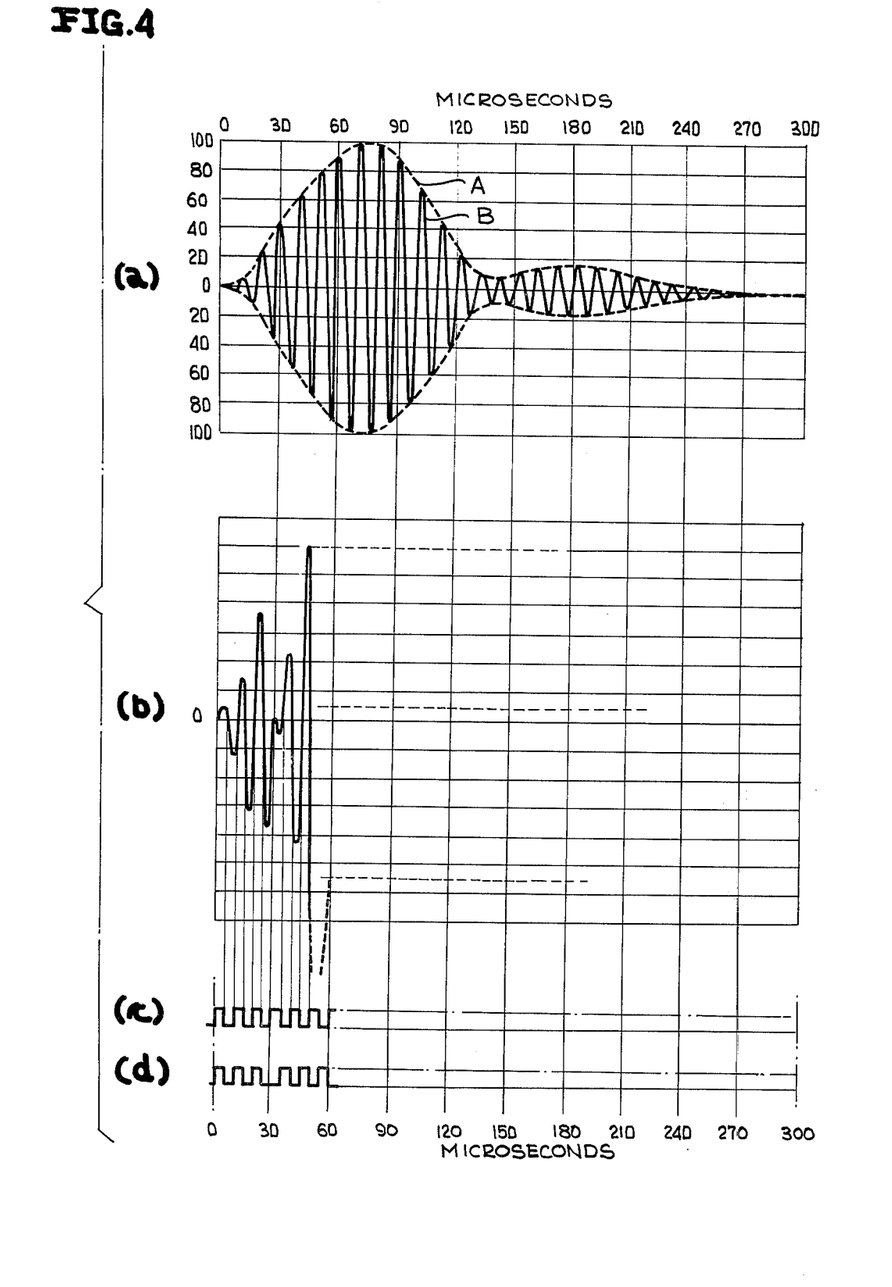
FIGS. 4a through 4d are timing diagrams illustrating the received LORAN-C pulse and waveforms derived therefrom for use in the present invention.

Referring specifically to FIG. 1 of the accompanying drawings, a LORAN-C receiver according to the present invention receives standard LORAN-C pulsed carrier signals at antenna 10. The signals are passed through a narrow-band filter and amplifier 11 which is tuned to the LORAN-C 100 KHz carrier frequency. A typical received LORAN-C pulse is illustrated in FIG. 4a wherein the 100 KHz carrier is shown as a solid line B and the pulse envelope is shown as a dashed line A. The received pulse is illustrated in pure form without noise which often is as high or higher than the level of the initial carrier cycles in the pulse. It is the function of the present invention to precisely track a specific location on the received pulse. That is, the present invention permits a tracking pulse to be repetitively generated in time coincidence with the same portion of each received pulse.

The received pulse is next applied to an envelope deriver circuit 12 which is illustrated in greater detail in FIG. 3. Referring to FIG. 3, the received pulses are passed from filter-amplifier 11 to both a half-cycle delay circuit 13 and a summing circuit 14. The half cycle delay circuit, as its name implies, delays the received pulse by one-half cycle of the carrier, or five microseconds for the 100 KHz LORAN-C carrier. The delayed pulse is then amplified by amplifier 15 and applied to summing circuit 14 where it is summed with the undelayed signal. Circuit 14 is therefore always summing two signals which are 180° out of phase but which differ in amplitude because of the shape of envelope A and the amplification factor of amplifier 15. The output signal from summing circuit 14 is an amplitude-modulated 100 KHz signal which is in phase with the received 100 KHz carrier until a time which is determined by the amplification factor of amplifier 15; thereafter, the summed signal is 180° out of phase with the received carrier. It is convenient and conventional to select the gain of amplifier 15 so that the output signal of summing circuit 14 exhibits a phase reversal at the start of zero crossover between the third and fourth cycles of the received pulse. Such a signal is illustrated in FIG. 4b and is described herein as the envelope derived signal. It is to be noted in FIG. 4b that the third carrier cycle terminates at the 30 microsecond time of the pulse and reverses phase at start of the fourth carrier cycle, after which point the envelope-derived signal remains 180° out of phase with respect to the received signal in FIG. 4a. It is the phase reversal at the end of the third cycle which provides a fixed reference time in the received pulse; and it is this fixed reference time which is tracked for purposes of time measurement.

Referring again to FIG. 1, the envelope-derived pulses are applied to limiter circuit 16 where the carrier half-cycles are hard limited to provide the square wave illustrated in FIG. 4d. It is noted in FIG. 4d that the square wave exhibits a phase reversal at the 30 microsecond point or at the start of the fourth carrier cycle. The received pulsed carrier signal, in unshifted form, is also applied from amplifier-filter 11 to a limiting circuit 17 where it is likewise hard-limited to provide the waveform illustrated in FIG. 4c. The phase relationship between the limited received signal and the limited envelope-derived signal is readily apparent in FIGS. 4c and 4d. These signals are utilized in the cycle selection technique of the present invention in a manner to be described subsequently.

Still referring to FIG. 1, a 10 MHz clock source 20 serves as the basic timing reference for the circuit. Clock source 20 is an oscillator with a stable frequency which is a precise multiple of the received 100 KHz carrier frequency. The 10 MHz signal from source 20 drives a ten-phase clock generator 21 which is a one-to-ten commutator. More particularly, tenphase clock generator 21 has ten output lines, each of which provides a 1 MHz pulse train, one train for each of ten successive cycles of the 10 MHz signal. The ten 1 MHz pulse trains are successively spaced by equal increments of 0.1 microseconds and all are fed to a 1 MHz phase selector 22. The phase selector is simply a multiplexer which passes only the one 1 MHz phase which corresponds to the address stored in up-down counter 23. This counter, which operates in a manner to be described below, is thus capable of selecting any phase of the output signal of phase selector 22 in increments of 0.1 microsecond each.

The selected 1 MHz phase is frequency-divided by a factor of ten at frequency divider 24 and passed to a time adjustment circuit 25 which is controllable to add or delete a pulse to 100 KHz pulse train passed by divider 24. Frequency divider 26 then divides the frequency of the resulting pulse train by a factor of ten and passes the resulting 10 KHz pulse train to MRI (Master Repetition Interval) counter 27. This counter is preset and provides output pulses at substantially the LORAN-C pulse repetition rate. This repetition rate varies in different regions of the world; in the eastern United States, for example, the interval between LORAN-C pulses is 99,300 microseconds. The output pulses from MRI counter 27 are thus provided in accordance with such interval and may be shifted in 0.1 microsecond steps (at phase selector 22) or 10.0 microsecond steps (at time adjustment circuit 25).

The output pulses from MRI counter 27 are applied to a timing synchronizer 28. One example of a circuit suitable for synchronizer 28 is the circuit Model SN74174N, available commercially from Texas Instruments, Inc., Dallas, Texas. This circuit provides a series of pulses once during each master timing interval after being triggered by counter 27. These pulses bear a precise time relationship to the output pulse from counter 27 and to each other, and all of these pulses are illustrated in the timing diagram of FIGS. 5a, b, c, and d. First, as illustrated in FIG. 5a, timing synchronizer 28 provides a SYNC CLOCK pulse which is applied to up-down counter 23 for reasons to be subsequently described. In addition, some predetermined time after the SYNC CLOCK, a TRACK GATE is applied to the clock terminal of a flip-flop 29, the data terminal of which receives the hard-limited received 100 KHz carrier from limiter 17.

Timing synchronizer 28 also generates four sampling strobe pulses as illustrated in FIG. 5b. Sampling strobe 1 is generated 7.5 microseconds earlier than the TRACK GATE, or precisely three-quarters of a 100 KHz carrier cycle before the TRACK GATE. Sampling strobe 2 is generated 2.5 microseconds or one-quarter cycle before the TRACK GATE. Sampling strobe 3 is generated 2.5 microseconds or one-quarter cycle after the TRACK GATE; and sampling strobe 4 is generated 7.5 microseconds or three quarters of a carrier cycle after the TRACK GATE. The four sampling strobes are applied to a sample and hold circuit 30 where each pulse acts to store the contemporaneous binary level present at the output terminal of limiter 16. One example of a circuit suitable for the sample and hold circuit 30 is the circuit Model SN7474N, available commercially from Texas Instruments, Inc. Dallas, Texas.

A final pulse provided by timing synchronizer 28, as illustrated in FIG. 5d, is the END OF SAMPLE pulse which occurs some time after the last sampling strobe. The END OF SAMPLE pulse is applied to an interval counter 31 and a clock control circuit 32, both which are described in greater detail subsequently.

As previously mentioned, the TRACK GATE (FIG. 5c) has the same repetition rate as the received LORAN-C pulses. If a measurement is to be made and the TRACK GATE is not locked onto the phase reversal point in the envelope-derived signal from limiter 16, the position of the TRACK GATE may be coarsely adjusted (by conventional manual or automatic means, not shown) until it is in rough time coincidence with the received LORAN-C pulse; this is not a mandatory requirement, however. Each TRACK GATE clocks flip-flop 29 to enter the contemporaneous binary level of the carrier signal from limiter 17. The Q output signal of flip-flop 29 reflects this binary level which is applied as a steering control to up-down counter 23. The counter adds or subtracts a count upon the occurrence of the next SYNC CLOCK pulse from timing synchronizer 28. If the limited carrier signal is binary "1" when the TRACK GATE is generated, then the TRACK GATE is sitting in the positive half cycle of the received carrier and must be moved to the left (i.e., generated earlier) during the next received LORAN-C pulse so that it can be positioned over a positive-going zero-crossing at the termination of a cycle. Likewise, a binary "0" in flip-flop 29 indicates that the TRACK GATE is either within a negative half cycle of the received carrier or not on the LORAN-C pulse at all and must therefore be generated later or moved to the right. The count in counter 23 is incremented or decremented by one accordingly at the next SYNC PULSE, and the immediately earlier or later 1 MHz phase is selected at phase selector 22. The position of the TRACK GATE is therefore jumped by 0.1 microseconds in the proper direction until the TRACK GATE reaches a positive-going zero-crossing in the received carrier. Importantly, this may not be the correct positive going zero-crossing, i.e., the zero-crossing corresponding to the thirty microsecond phase-reversal point in the envelope-derived signal.

The cycle selection circuit, described subsequently, is used to seek the correct zero-crossing and operates in conjunction with time adjustment circuit 25 to jump the TRACK GATE one complete carrier cycle (10 microseconds) at a time. Specifically, if after a sample interval the cycle evaluation network determines that the TRACK GATE is too early (i.e., left of the proper time), the L signal is applied to circuit 25 which adds a single count pulse to the pulse train applied to MRI counter 27. If, on the other hand, the cycle evaluation circuit finds that the TRACK GATE is too late, the R signal causes the time adjustment circuit to delete one count from the count pulse train applied to MRI counter 27 during the next counting interval.

The four levels sampled at network 30 by sampling strobes 1-4 are applied to a pattern decoder 33 which determines whether the TRACK GATE is centered, early or late relative to the 30 microsecond phase reversal point in the envelope-derived signal. One example of a circuit suitable for the pattern decoder 33 is the circuit Model SN74188AN, available commercially from Texas Instruments, Inc., Dallas, Texas. More particularly, pattern decoder 33 includes a read only memory and circuitry for comparing the four sampled binary levels with stored four-bit patterns. If sampling strobes 1 through 4 produce a sampled binary level pattern of 1-0-0-1, as illustrated in phantom lines in the first group of strobes in FIG. 5b, then pattern generator 33 recognizes this as a centered condition in which the TRACK GATE is centered on the 30 microsecond phase reversal point. Consequently, both output lines L (left) and R (right) from the pattern decoder remain binary 0. If, as illustrated in phantom near the third group of sampling strobes in FIG. 5b, the sampled pattern is 1-0-1-0, pattern decoder 33 recognizes a left condition wherein the TRACK GATE is positioned one half cycle too early with respect to the phase reversal in the envelope-derived signal. Consequently, the L signal becomes binary one. Likewise a sampled 0-1-0-1 pattern is recognized as a right or late condition by the pattern decoder and the R signal is rendered binary 1 accordingly. Any of the other possible thirteen four-bit patterns is clearly the result of noise. More particularly, since the track gate must be on a positive-going zero crossing, an early or left condition always produces a 1-0-1-0 pattern, a proper condition always produces a 1-0-0-1 pattern, and a late or right condition always produces a 0-1-0-1 pattern. Since, as best seen in FIG. 4a, the carrier cycles to the right of the 30 microsecond point are of greater amplitude than the carrier cycles to the left of that point, noise is more likely to affect left patterns than right patterns. Thus, a 1-0-1-0 pattern may be adversely affected by noise to become 0-0-1-0 or 1-0-1-1, etc., and if desired, the pattern decoder 33 may be designed to recognize certain of the thirteen noise-produced patterns as left conditions. This is an optional feature which need not be included.

The L or R signals are received by clock control circuit 32 and steered to left and right counters 34 and 35 respectively when the END OF SAMPLE pulse is generated at timing synchronizer 28.

The END OF SAMPLE pulses are also applied to interval counter 31 which counts these pulses until a predetermined count is reached. This count depends upon the noise environment in which the receiver is operating; typically a longer count is selected in noisy environments than would be the case in environments where the signal-to-noise ratio of the received signal is high. When the count is reached, indicating that that number of LORAN-C pulses have been received and sampled during the sample interval, counter 31 provides an END OF SAMPLE INTERVAL pulse to a spill clock control circuit 36. This permits pulses of high repetition rate from spill clock generator 37 to pass through the spill clock control circuit 36 to the clock control circuit 32 which in turn applies the SPILL CLOCK pulses simultaneously to both left counter 34 and right counter 35. These counters have equal count capacity and each has a count stored therein depending upon the number of left or right samples detected during the multiple sample sampling interval. The high repetition rate spill pulses increment both counters 34 and 35 simultaneously. When either counter spills over, this fact is detected by overflow detector 38 which provides either or LOD (left overflow detected) or ROD (right overflow detected) pulse to the spillover control circuit 36. This circuit, in turn generates a series of COUNT pulses which are spill clock pulses counted at a binary difference counter 39. If the difference between the left sample and right sample counts in counters 34 and 35 was greater than some pre-established threshold, difference counter 39 reaches that threshold count before the other counter overflows and provides a THRESHOLD pulse. This pulse is applied to the spill clock control circuit which responds with a STOP pulse. The STOP pulse is fed to a cycle evaluation network 40 which recognizes that the TRACK GATE is not centered, looks to the output signals from the overflow detector 38 to determine which of counters 34, 35 has overflowed, and provides a suitable L or R signal to time adjustment circuit 25. The STOP pulse also prevents further application of SPILL CLOCK pulses to counters 34 and 35, and is applied to the interval counter 31 where it resets the counter and permits the start of a new series of samples.

If the difference in counts registered in counters 34 and 35 is not in excess of the pre-established threshold, difference counter 39 does not reach that threshold before both of counters 34 and 35 overflow. When the second of counters 34, 35 overflows, the STOP pulse is generated within the spill clock control circuit 36 to reset the interval counter 31 and initiate an evaluation at cycle evaluation circuit 40. Circuit 40 examines the signals from overflow detector 38 and determines that since both counters 34 and 35 overflowed, the difference between their counts was less than the threshold and therefore the TRACK GATE is properly positioned.

Figures 2, 5:
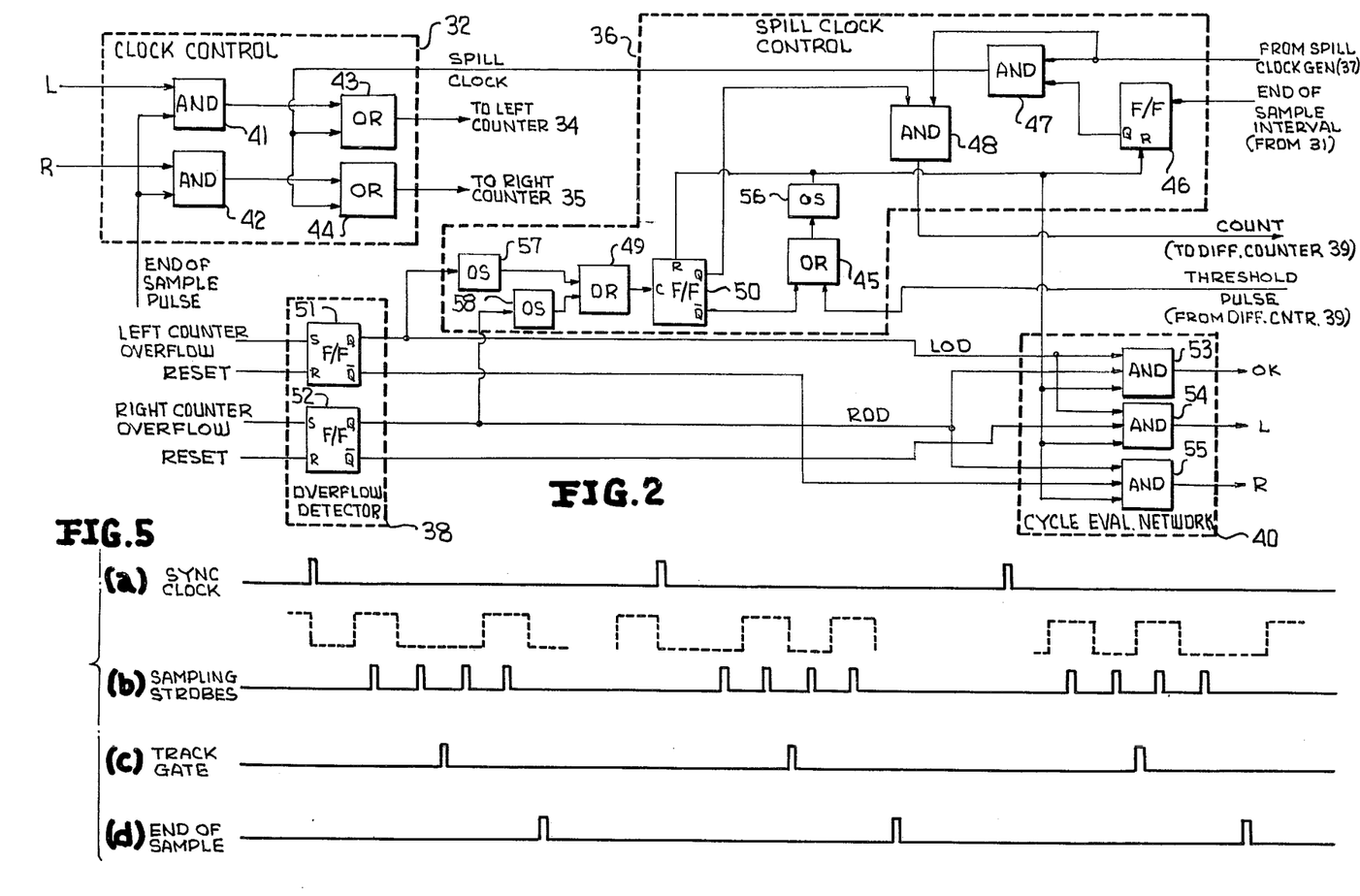
FIG. 2 is a schematic diagram of a portion of the circuit of FIG. 1.

Considering the cycle selection circuitry of the present invention in greater detail, reference is made to FIG. 2 of the accompanying drawings. The clock control circuit 32 includes two-input AND gates 41 and 42 and two-input OR gates 43 and 44. One input signal to AND gate 41 is the L signal from pattern decoder 33, the signal being binary "1" when the four samples of the envelope-derived signal indicate that the TRACK GATE is early or to the left of its proper position. One input signal to AND gate 42 is the R signal from pattern decoder 33, the signal being binary "1" when the pattern decoder recognizes a late condition. Each of gates 41, 42 also receives the END OF SAMPLE pulse (FIG. 5d) from timing synchronizer 28 so that a left or right condition detected during a sample is passed by one of these gates at the end-of-sample time. The output signal from gate 41 is applied to OR gate 43 along with the SPILL CLOCK from spill clock control circuit 36. The output signal from gate 42 is passed to OR gate 44 along with the SPILL CLOCK. OR gate 43 feeds pulses to left counter 34 whereas OR gate 44 feeds pulses to right counter 35. Thus, for each sample by strobes 1 through 4, recognized left and right conditions are registered as counts at respective counters 34 and 35. When sampling stops and the SPILL CLOCK is applied to gates 43, 44, each spill clock pulse increments both counters 34 and 35.

The overflow detector 38 is simply a pair of flip-flops 51 and 52. Flip-flop 51 is set by an overflow from left counter 34; flip-flop 52 is set by an overflow right counter 35. The Q and $\overline{Q}$ signals from both flip-flops are applied to cycle evaluation network 40; in addition, the Q signals (LOD and ROD) from both flip-flops are applied to the spill clock control circuit.

The spill clock control circuit includes a flip-flop 46 which is set (Q=1) by the END OF SAMPLE INTERVAL pulse provided by interval counter 31 after the required number of samples have been taken. When set, flip-flop 46 enables AND gate 47 to pass SPILL CLOCK pulses to the clock control circuit which, in turn, feeds the pulses to both left and right counters 34 and 35. As previously described, these counters count SPILL CLOCK pulses until one or both counters reach capacity and spill over.

The spill clock control circuit also includes one-shot multivibrators 57 and 58 which are fed by the Q signals from respective flip-flops 51 and 52 in the overflow detector. If left counter 34 overflows to set flip-flop 51, one-shot 57 provides an output pulse; likewise, an overflow at right counter 35 results in an output pulse from one-shot 58. The output pulses from one-shots 57 and 58 are applied to a two-input OR gate 49 which in turn feeds the clocking terminal of a toggle-type flip-flop 50. Flip-flop 50 is normally reset (Q=0; $\overline{Q}$=1) at the end of an evaluation operation (in a manner to be described) so that the first overflow of either counter 34 or 35 toggles flip-flop 50 to its set state (Q=1; $\overline{Q}$=0). The Q signal from flip-flop 50 enables AND gate 48 to pass SPILL CLOCK pulses from spill clock generator 37 as COUNT pulses to difference counter 39. If the other of counters 34 and 35 overflows before a threshold count is reached at difference counter 39, the second overflow once again results in a toggling of flip-flop 50 which is reset (Q=0; $\overline{Q}$=1) thereby. AND gate 48 is then disabled and prevents further counting by difference counter 39. In addition, the binary "1" $\overline{Q}$ signal from flip-flop 50 is passed by OR gate 45 to trigger another one-shot multivibrator 56. The latter provides the STOP pulse which resets flip-flop 46 to prevent further application of SPILL CLOCK pulses to left and right counters 34 and 35. The STOP pulse is also applied to the cycle evaluation network 40 where it initiates an evaluation in the manner to be subsequently described. It is also noted that the STOP pulse is applied to the reset terminal of flip-flop 50 which has already been reset by the second overflow of left/right counters 34, 35.

If before the second overflow of left/right counters 34, 35 there is a threshold condition reached at difference counter 39, the THRESHOLD signal is provided by counter 39 at OR gate 45. The latter triggers one-shot 56 to generate the STOP pulse and thereby reset flip-flops 50 and 46; in addition, an evaluation is initiated at network 40. From the foregoing it is seen that the spill routine is terminated by either a second overflow at the left/right counters or the attainment of the threshold count at difference counter 39.

The cycle evaluation network 40 includes three three-input AND gates 53, 54 and 55. AND gate 53, which is optional insofar as cycle evaluation is concerned according to the present invention, receives the LOD signal from flip-flop 51, the ROD signal from flip-flop 52, and the STOP signal from one-shot 56. AND gate 54 receives the LOD signal from flip-flop 51, the $\overline{Q}$ signal from flip-flop 52, and the STOP signal. AND gate 55 receives the ROD signal, the $\overline{Q}$ signal from flip-flop 51 and the STOP signal.

If both counters 34 and 35 have overflowed from spill pulses to generate the STOP pulse, AND gate 53 is enabled to provide an OK signal. This signal indicates that the count difference between the left and right counters is less than the threshold and therefore the TRACK gate is positioned on the proper cycle of the LORAN-C pulse. If only one counter has overflowed and the threshold is reached in difference counter 39 to initiate the STOP pulse, either of AND gates 54 or 55 provides an output signal, depending upon which of the left and right counters has overflowed. The L signal from AND gate 54 indicates that the TRACK GATE is early or to the left of the proper cycle; the R signal from AND gate 55 indicates that the TRACK GATE is late or to the right of the proper cycle. The L and R signals are applied to the time adjustment circuit 25 (FIG. 1) to add or delete 10 microseconds from the interval before the next TRACK GATE is generated.

Briefly reviewing the cycle selection technique of the present invention, cycle selection involves sampling the derived envelope signal, evaluating the sample results, and deciding if the TRACK GATE is earlier (left) or later (right) in real time than the proper cycle. Samples are taken during two carrier half-cycles between the TRACK GATE and two carrier half cycles after the TRACK GATE. At the start of a cycle selection measuring period, all counters are set to zero. A set of samples are obtained from the derived envelope signal, and the network evaluates the samples and delivers one of two decisions: TRACK GATE is "left"; or TRACK GATE is "right". If neither a left or right is recognized, the set of samples from the next pulse is awaited.

Four counters exist in the network. Counter 35 records the number of rights recognized; counter 34 records the number of lefts recognized; and counter 31 is cognizant of the number of patterns that have been sampled. When the end of the integration period is reached (for example, 2048 patterns sampled), pattern evaluation ceases. The spill clock is then permitted to advance both the right and left counters at a steady rate. An overflow detection circuit senses which one of counters 34 and 35 achieves the first overflow (counter is full). When this happens, the counter which has failed to overflow is permitted to continue counting. A fourth counter 39 (difference counter) is activated which records the number of spill pulse pulses delivered after the first overflow. If the second counter achieves overflow before the difference counter achieves a threshold count, the network indicates proper cycle selection. If no overflow is detected, then a timing adjustment is delivered to the processor which re-initiates sampling with the TRACK GATE one carrier cycle removed from its previous location. The procedure continues until the proper cycle has been identified.

The most important aspect of the cycle selection technique is the fact that left and right samples are counted while centered samples are ignored. The difference between the counted left samples and counted right samples is then used as the criterion for determining whether the TRACK GATE is left, center or right. Distortion of the samples by random noise is accommodated by this techinque since, for a true centered condition, random noise will provide the same number of erroneous left and right samples. If the difference between the left and right sample counts is less than the predetermined threshold, the TRACK GATE may be considered properly positioned. If the TRACK GATE is actually left or actually right, the true sample counts, which are unaffected by noise, will add to the equally divided (between left and right) noise-distorted counts to give a left or right indication.

In an actual working example we have found 2048 sets of samples to be a workable number and that a threshold of 196 provides excellent evaluation results. That is, if the difference between left counts and right counts is less than 196 after 2048 samples, the TRACK GATE is considered positioned on the proper cycle. Of course, noise levels in different areas may require variation of the sample number and threshold count.

It should be noted that the cycle evaluation technique described herein could work in conjuction with a voltage controlled oscillator in a phase locked loop instead of phase switching as effected by counter 23 and phase selector 22.

Bearing in mind that the inventive concept described herein involves monitoring only early (left) and late (right) samplings and ignoring on-time (centered) samplings so as to make use of the random nature of noise, it is important to note that the specific circuitry described herein may be varied significantly within the framework of that inventive concept. For example, in measuring the difference between left and right counts over the desired number of pulse repetition intervals, individual left and right counters (34–35) need not be employed; rather, a single up/down counter may be used to count up for left indications and down for right indications, or vice versa. Conventional count decoding circuitry could then be used to determine the sense and magnitude of the count at evaluation time and whether or not the threshold was exceeded. The threshold itself can of course be varied, and in fact, may be different for left and right determinations if noise conditions and experience in particular geographical areas so indicate.

Likewise the number of sample strobes need not be limited to four; two or more may be employed. Specifically, if two strobes are placed one-quarter cycle before and after the TRACK GATE, and if the TRACK GATE is positioned coincident with a positive-going crossover in the received carrier, the two-sample pattern, if unaffected by noise, will be 0—0 for centered condition, 0-1 for left condition, and 1-0 for right condition. Of course, if only two samples are taken, the effects of noise are more likely to be more pronounced. Nevertheless, an other-than-four-sample pattern is certainly possible. The important point is that the samples be taken sufficiently removed from the zero-crossings to prevent ambiguous samplings of signal polarity.

The particular logic arrangements illustrated in FIG. 2 are of course examples of specific approaches to achieving the desired result. The circuitry can readily be redesigned within the framework of the inventive concept. It should also be noted with respect to FIG. 2 that, for the sake of clarity in portraying the operational characteristics, certain resetting and timing signals have been omitted. Such signals are used conventionally in logic systems and do not require protracted discussion herein. It is sufficient to note that all flip-flops and counters are reset prior to the start of a multiple sampling routine.

While we have described and illustrated specific embodiments of our invention, it will be clear that variations of the details of construction which are specifically illustrated and described may be resorted to without departing from the true spirit and scope of the invention as defined in the appended claims.

We claim:

1. In a system wherein transmitted energy pulses are received at a known repetition rate and in the form of a sequence of multiple carrier frequency cycles and wherein the pulse envelope has a rise time which extends over a plurality of carrier frequency cycles, cycle selection apparatus for generating a reference pulse at the same repetition rate as the received pulses and located at the same reference point in time during each received pulse, said cycle selection apparatus comprising:
   phase-adjustable means for generating said reference pulse at the same repetition rate as said received pulses;
   signal modification means responsive to said received pulses for providing a derived signal which is cophasal with the first n carrier cycles of each received pulse and phase-shifted with respect to subsequent carrier cycles in each received pulse, where n is a predetermined number and said reference point in time corresponds to the point at which the phase shift begins in said derived signal;
   sampling means synchronized with said phase-adjustable means and operable for each reference pulse for sampling the polarity of said derived signal at least at times one quarter of a carrier cycle before and after said reference pulse;
   decoding means responsive to the polarity samples taken by said sampling means for each reference pulse for determining whether said reference pulse is earlier or later than said reference point in time;
   counter means responsive to said decoding means for registering an early count for each received pulse for which the corresponding reference pulse is determined to be earlier than said reference point in time and for registering a late count for each received pulse for which the corresponding reference pulse is determined to be later than said reference point in time;
   difference detecting means operable after a specified number of said received pulses are received for determining the difference between early and late counts and providing an early indication if the registered early counts exceed the registered late counts by a predetermined amount and providing a late indication if the registered late counts exceeds the registered early count by a predetermined amount;
   control means responsive to said early and late indications for controlling said phase-adjustable means to shift subsequently-generated reference pulses in time relative to said received pulse and in a sense determined by the early and late indications.

2. The apparatus according to claim 1 wherein the phase-shifted carrier cycles in said derived signal are shifted by 180° relative to the carrier cycles in said received pulses, and further comprising:
   coarse adjustment means for initially positioning said reference pulse in time coincidence with any zero crossover having a predetermined slope polarity in the carrier signal in said received pulses; and
   wherein said control means comprises means for shifting said reference pulse by one complete carrier cycle period in response to said early and late indications.

3. The apparatus according to claim 1 wherein said sampling means comprises: timing synchronizer means for generating sampling gates three-quarters and one quarter of a carrier cycle before and after said reference pulse; and
   sample and hold means for temporarily storing amplitude samples of said derived signal during each of said sampling gates.

4. The apparatus according to claim 2 wherein said decoding means comprises:
   a read-only storage device in which plural four-sample patterns are stored, each stored pattern corresponding to an early, late or centered condition in which said reference pulse is early, late or centered, respectively, relative to said reference point in time; and
   means for comparing the four amplitude samples in said sample and hold means with respective samples in each of said stored four-sample patterns to determine whether the sample and hold pattern matches any of the stored patterns.

5. The apparatus according to claim 4 wherein said counter means comprises:
   first and second counters;
   means responsive to said decoding means for incrementing said first counter each time the reference pulse is determined to be earlier than said reference point in time and for incrementing said second counter each time the reference pulse is determined to be later than said reference point in time.

6. The apparatus according to claim 5 wherein said difference detecting means and said control means include:
   means for generating clock pulses at a repetition rate greatly in excess of the repetition rate of said received pulses;
   means operable after said specified number of received pulses are received for applying said clock pulses simultaneously to be counted by both said first and second counters;
   spillover detection means for detecting when each of said first counter reaches maximum count;
   difference counter means for counting the number of clock pulses counted between spillover times of said first and second counter, said difference counter means including threshold count detector means for providing a threshold signal if the count in said difference counter reaches a threshold count equal to said predetermined amount;

means responsive to said threshold signal for blocking further application of clock pulses to said first, second and difference counters and for generating a control pulse; and means responsive to said control pulse to whichever one of said first and second counters has spilled over for generating a signal for controlling said phase-adjustable means shift subsequently-generated reference pulses by one carrier cycle in time.

7. The apparatus according to claim 1 wherein said counter means comprises:

first and second counters;

means responsive to said decoding means for incrementing said first counter each time the reference pulse is determined to be earlier than said reference point in time and for incrementing said second counter each time the reference pulse is determined to be later than said reference point in time.

8. The apparatus according to claim 7 wherein said difference detecting means and said control means include:

means for generating clock pulses at a repetition rate greatly in excess of the repetition rate of said received pulses;

means operable after said specified number of received pulses are received for applying said clock pulses simultaneously to be counted by both said first and second counters;

spillover detection means for detecting when each of said first counter reaches maximum count;

difference counter means for counting the number of clock pulses counted between spillover times of said first and second counter, said difference counter means including threshold count detector means for providing a threshold signal if the count in said difference counter reaches a threshold count equal to said predetermined amount;

means responsive to said threshold signal for blocking further application of clock pulses to said first, second and difference counters and for generating a control pulse; and means responsive to said control pulse to whichever one of said first and second counters has spilled over for generating a signal for controlling said phase-adjustable means to shift subsequently-generated reference pulses by one carrier cycle in time.

9. The apparatus according to claim 1 wherein said predetermined amount is on the order of 10 percent of n.

10. The apparatus according to claim 9 wherein n is approximately 2000 and said predetermined amount is approximately 200.

11. In a LORAN-C receiver wherein received pulses are envelope-derived to provide a derived signal in which the kth and subsequent carrier cycles are phase-reversed relative to carrier cycles in each received pulse, and including means for generating a tracking pulse and means for rendering said tracking pulse time coincident with any zero crossing having a predetermined slope polarity in the received pulse carrier, cycle selection apparatus for rendering said tracking pulse time coincident with the zero crossing between the k - 1 and kth carrier cycles of the received pulse, said cycle selection apparatus comprising:

means for sampling the polarity of said derived signal in a set of at least four samples at times corresponding to one-quarter and three-quarters of a carrier cycle before and after each of n tracking pulses, where n is a predetermined number;

decoding means responsive to each set of polarity samples taken during each tracking pulse repetition interval for providing early and late indications if the tracking gate is positioned earlier or later, respectively, than the zero crossover between the k - 1 and kth carrier cycles of the received pulse;

means for registering the difference between the number of early and late indications provided after n sets of samples; and means responsive to said difference for shifting subsequent tracking pulses one carrier cycle later if the early indications exceed the late indications by more than a pre-established difference and for shifting subsequent tracking pulses one carrier cycle earlier if the late indications exceed the early indication by a pre-established difference.

12. The apparatus according to claim 11 wherein said means for registering comprises:

first and second counters;

circuit means for incrementing said first counter in response to each early indication provided by said decoding means and for incrementing said second counter in response to each late indication provided by said decoding means;

interval count means for counting the number of sample sets taken by said means for sampling; and difference means responsive to a sample set count of n at said interval count means for determining the difference between the counts in said first and second counters.

13. The apparatus according to claim 12 wherein n is approximately 2000 and said pre-established difference is approximately 200.

14. In a LORAN-C receiver wherein received pulses are envelope-derived to provide a derived signal in which the $k + h$ and subsequent carrier cycles are phase-reversed relative to carrier cycles in each received pulse, and including means for generating a tracking pulse and means for rendering said tracking pulse time coincident with any zero crossing of predetermined slope polarity in the received pulse carrier, a method for rendering said tracking pulse time coincident with the zero crossing between the $k - 1$ and kth carrier cycle of the received pulse, said method comprising the steps of:

sampling the polarity of said derived signal at least at four times corresponding to one-quarter and three-quarters of a carrier cycle before and after each of n tracking pulses, where n is a predetermined number;

in response to each set of polarity samples taken for each tracking pulse, providing early and late indications if the tracking gate is positioned earlier or later, respectively, than the zero crossover between the $(k - 1)$th and kth carrier cycles of the received pulse;

registering the difference between the number of early and late indications provided after n sets of samples; and in response to said difference, shifting subsequent tracking pulses one carrier cycle later if the early indications exceed the late indications by more than a pre-established difference and for shifting subsequent tracking pulses one carrier cycle earlier if the late indications exceed the early indications by a pre-established difference.

15. In a LORAN-C receiver, a method for locating and tracking with a tracking gate a particular zero crossover point in the carrier of a received LORAN-C pulse, said method being characterized by the steps of:

generating an envelope-derived signal from said received pulses wherein a carrier phase reversal is provided at said particular zero-crossover point;

repetitively sampling the same plurality of half cycles of said envelope-derived signal for multiple received LORAN-C pulses;

comparing said samples to pre-stored data to determine whether the tracking gate is earlier or later than said carrier phase reversal;

registering the difference between early and late determinations made during said multiple received pulses; and re-positioning the tracking gate earlier or later in accordance with the size and sense of said difference.

* * * * *